(12) United States Patent
Mui et al.

(10) Patent No.: US 10,856,344 B2
(45) Date of Patent: Dec. 1, 2020

(54) METHOD AND AN APPARATUS FOR REDUCING CONNECTION SET-UP TIME IN A COMMUNICATIONS NETWORK

(71) Applicant: Hong Kong Applied Science and Technology Research Institute Co., Ltd., Shatin (HK)

(72) Inventors: Ka Ho Mui, Kowloon (HK); Wei Chen, Tai Wai (HK); Kuankuan Yang, Shatin (HK); Jingwei Liu, Kowloon (HK)

(73) Assignee: Hong Kong Applied Science and Technology Research Institute Company Limited, Shatin (HK)

( * ) Notice: Subject to any disclaimer, the term of this patent is extended or adjusted under 35 U.S.C. 154(b) by 0 days.

(21) Appl. No.: 16/354,337

(22) Filed: Mar. 15, 2019

(65) Prior Publication Data

US 2020/0296775 A1  Sep. 17, 2020

(51) Int. Cl.
| | |
|---|---|
| *H04W 76/12* | (2018.01) |
| *H04W 76/11* | (2018.01) |
| *H04W 8/08* | (2009.01) |
| *H04W 56/00* | (2009.01) |
| *H04W 80/06* | (2009.01) |

(52) U.S. Cl.
CPC ............ *H04W 76/12* (2018.02); *H04W 8/08* (2013.01); *H04W 56/001* (2013.01); *H04W 76/11* (2018.02); *H04W 80/06* (2013.01)

(58) Field of Classification Search
CPC ......... H04L 67/02; H04L 69/22; H04L 69/04; H04L 67/28; H04B 7/185; H04W 76/12
See application file for complete search history.

(56) References Cited

U.S. PATENT DOCUMENTS

| | | |
|---|---|---|
| 8,165,098 B2 | 4/2012 | Teo et al. |
| 8,792,408 B2 | 7/2014 | Racz et al. |
| 9,326,151 B2 | 4/2016 | Manssour |
| 9,769,797 B2 | 9/2017 | Johansson et al. |

(Continued)

FOREIGN PATENT DOCUMENTS

| | | |
|---|---|---|
| CN | 102098274 A | 6/2011 |
| CN | 10336970 A | 10/2013 |

(Continued)

OTHER PUBLICATIONS

3GPP 3rd Generation Partnership Project: Technical Specification Group Services and System Aspects: Study on Access Traffic Steering, Switching and Splitting Support in the 5G system architecture (Release 16) 3GPP TR 23.793 V1.2.1 (Dec. 2018) Dec. 31, 2018.

*Primary Examiner* — Syed Ali

(57) ABSTRACT

A method for setting-up a tunnel connection for transporting data packets over a high latency network connection in a communication network comprises the step of, at a module or node configured on a tunnel connection initiator side of the high latency network connection, using a non-TCP connection to encapsulate a set-up connection message for sending to a module or node configured on a core network (CN) side of the backhaul network to offset-up a data packet transport tunnel connection between the initiator side of the high latency network connection and core network (CN) side of the high latency network connection.

15 Claims, 10 Drawing Sheets

(56) References Cited

U.S. PATENT DOCUMENTS

| | | |
|---|---|---|
| 9,961,587 B2 | 5/2018 | Hecht et al. |
| 10,021,594 B2 | 7/2018 | Hecht et al. |
| 10,057,391 B2 | 8/2018 | Ahluwalia et al. |
| 2010/0054207 A1* | 3/2010 | Gupta .................. H04W 36/14 370/331 |
| 2011/0116377 A1* | 5/2011 | Batz .................... H04L 12/1407 370/235 |
| 2012/0076120 A1* | 3/2012 | Kovvali ................ H04W 76/11 370/338 |
| 2012/0218989 A1* | 8/2012 | Tanabe .................... H04L 12/66 370/352 |
| 2014/0064249 A1* | 3/2014 | Lee .................. H04W 36/0033 370/331 |
| 2015/0085845 A1* | 3/2015 | Wang .................. H04W 76/12 370/338 |
| 2015/0139075 A1* | 5/2015 | Bosch .................. H04L 65/105 370/328 |
| 2015/0237527 A1* | 8/2015 | Knutson ............... H04L 61/203 726/4 |
| 2015/0341273 A1 | 11/2015 | Naouri et al. |
| 2016/0165646 A1* | 6/2016 | Lee ..................... H04L 41/0896 455/436 |
| 2016/0192235 A1 | 6/2016 | Ahluwalia et al. |
| 2017/0105142 A1* | 4/2017 | Hecht .................... H04L 67/02 |
| 2017/0264695 A1* | 9/2017 | Markovitz .............. H04L 67/16 |
| 2017/0265175 A1 | 9/2017 | Gandhi |
| 2017/0347251 A1* | 11/2017 | Kim .................... H04W 76/12 |
| 2018/0084560 A1* | 3/2018 | Cho .................. H04W 72/1278 |
| 2019/0037025 A1* | 1/2019 | Li ........................ H04L 69/163 |
| 2019/0182363 A1* | 6/2019 | Bonaventure ........... H04L 69/14 |

FOREIGN PATENT DOCUMENTS

| | | |
|---|---|---|
| CN | 103369710 A | 10/2013 |
| CN | 102413477 B | 6/2014 |
| CN | 106716951 A | 5/2017 |

* cited by examiner

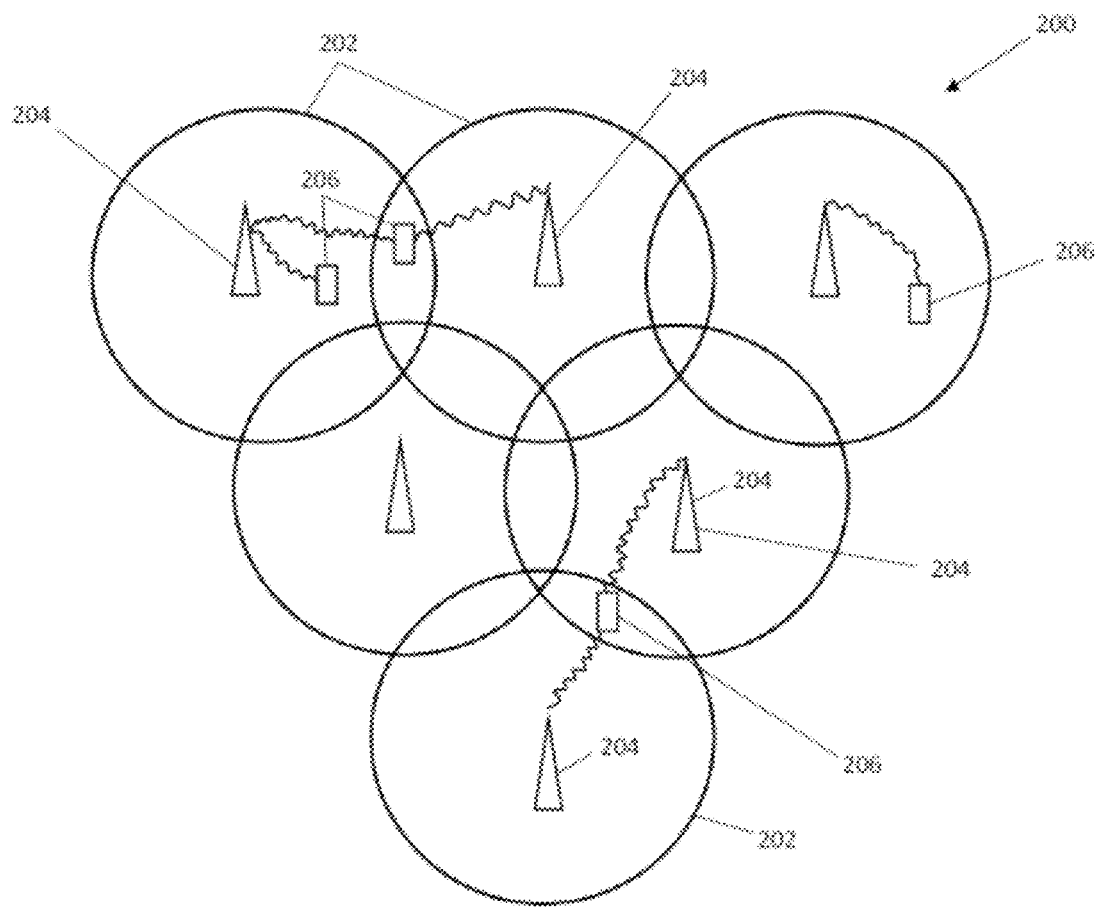
Figure 2
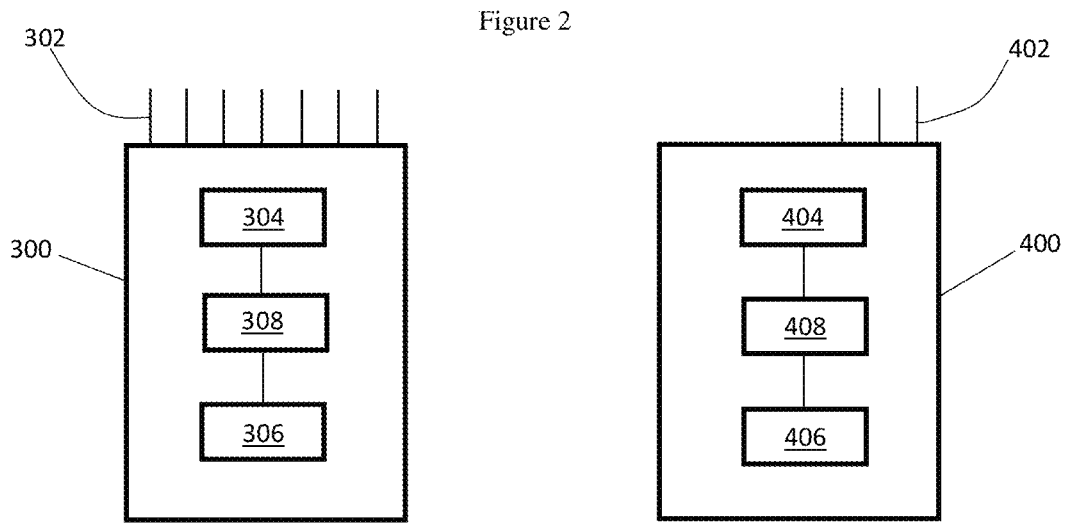
Fig. 3
Fig. 4

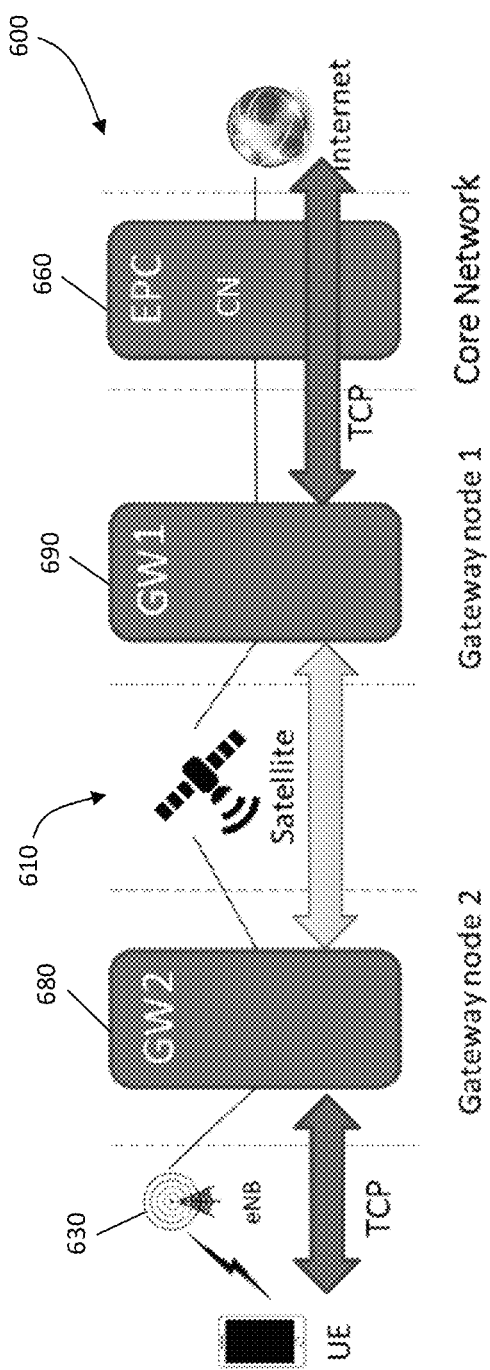
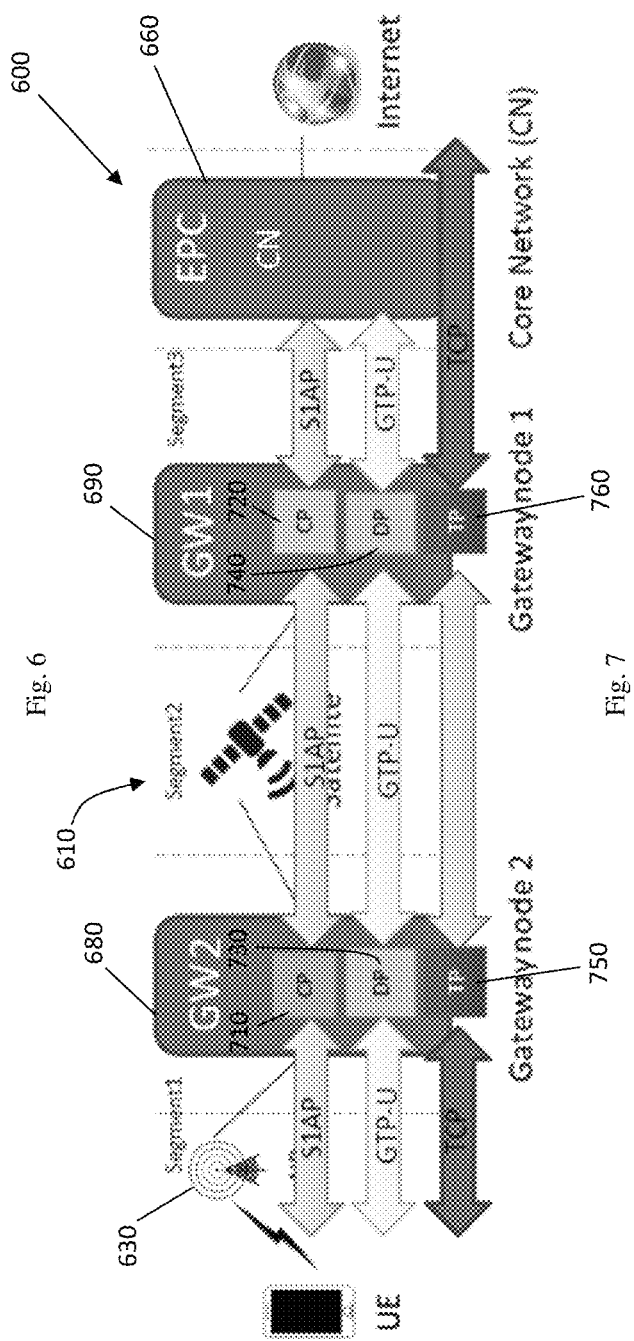
Fig. 6
Fig. 7

METHOD AND AN APPARATUS FOR REDUCING CONNECTION SET-UP TIME IN A COMMUNICATIONS NETWORK

FIELD OF THE INVENTION

The invention relates to a method and an apparatus for reducing connection set-up time in a communications network and, more particularly, but not exclusively, to reducing connection set-up time over a high latency network connection in a communications network.

BACKGROUND OF THE INVENTION

Wireless communication networks such as Fourth Generation (4G, also referred to as Long Term Evolution (LTE)) networks are presently widely deployed to provide various telecommunication services such as telephony, video, data, messaging, and broadcasts. However, whilst current 4G technology offers much faster data rates than its previous generations, it has limitations due to its bandwidth, scalability and number of users under individual cells.

The new radio (NR) standard for Fifth Generation (5G) networks has been developed and is being rolled out to provide new functionalities including enabling the connection of many things in, for example, the Internet of Things (IoT) with low latency and very greatly increased speeds. NR builds upon today's LTE networks, expanding and improving existing coverage with the goal to facilitate enhanced mobile broadband by using 5G small cells to boost the data rates on an LTE anchor network.

In communications networks, latency is a measure of delay. Latency may comprise a measure of the delay in setting-up a connection across a communications network or between specific nodes in said network. Latency may also comprise a measure of the delay in transmitting data to its destination in the network. Latency is normally measured as a round trip delay, although this is not necessarily always the case. Latency can also be considered as a measure of the responsiveness of the network as it affects the ability of the network to efficiently set-up connections and/or to efficiently carry data. For example, in a 4G or 5G wireless communications network which may include legacy network connections such as Second Generation (2G) or Third Generation (3G) connections and/or may include high latency backhaul network connections such as satellite network connections, the high latency of the legacy network connections and/or the backhaul network connections will considerably impact the overall latency of the 4G or 5G network. The same issues with latency may arise in other non-wireless communications networks which include legacy network connections and/or high latency backhaul network connections.

LTE networks, for example, are particularly well suited to handling the high capacity of voice and data carried over wireless communication networks. It is noted that the terminology "LTE" is not universal. "LTE" as used herein is a broad term that, depending on the context, may include the Evolved Universal Terrestrial Radio Access (E-UTRA), Evolved Universal Terrestrial Radio Access Network (E-UTRAN), System Architecture Evolution (SAE) and LTE-A. LTE is sometimes referred to as LTE/SAE. More information on LTE can be found in the standard documents for E-UTRA: 3GPP TS 36.211: "Evolved Universal Terrestrial Radio Access (E-UTRA); Physical channels and modulation;" 3GPP TS 36.212: "Evolved Universal Terrestrial Radio Access (E-UTRA); Multiplexing and channel coding;" 3GPP TS 36.213: "Evolved Universal Terrestrial Radio Access (E-UTRA); Physical layer procedures" the disclosures of which are incorporated herein by reference.

The LTE mobile network provides seamless Internet Protocol (IP) connectivity between user equipment (UE) and the packet data network (PDN). The LTE mobile network provides for higher bandwidths, better spectrum efficiency, wider coverage and full interworking with other access/backend systems, and provides for significantly higher data rates, at a significantly lower cost per bit. Such enhanced bandwidth and spectrum efficiency contribute to issues having regard to the backhaul of data and signaling communications from remote base stations (for example eNodeBs in 4G networks) back to their respective core network(s) (CN). In addition to user plane (UP) traffic from the various user terminals served by a given eNodeB at any given moment, the eNodeB backhaul traffic comprises a number of additional components, such as control plane (CP) signaling, and transport protocol overhead. Generally, 4G LTE networks employ general packet radio service (GPRS) tunneling protocol (GTP) to transport user data packets over the mobile backhaul between the eNodeBs and CN elements with GTP tunnels. GPRS tunneling protocol consists of a group of IP-based communications protocols used to carry general packet radio service (GPRS) within the Global System for Mobile communications (GSM), the Universal Mobile Telecommunications System (UMTS) and LTE networks. Maintaining the tunnel as the UE moves, however, requires heavy signaling, and the protocol stack effectively adds headers and thus introduces overhead.

Accordingly, LTE and other terrestrial mobile data networks require a significant amount of backhaul bandwidth, especially during peak times. Moreover, in view of the fact that the eNodeBs cover the local cells of the subscribers, they are deployed all across the geographical network coverage area, which may include remote sites that may be long distances from their respective CN(s). Thus, due to the large number of eNodeBs and the large geographical distribution of them, it is often neither feasible nor cost effective to deploy dedicated high-speed terrestrial backhaul links (e.g., fiber or cable), or high-speed microwave, to every such node. As a result, backhaul networks such as satellite networks are becoming more favorable as solutions for the eNodeB backhaul issues in LTE and other terrestrial mobile communications systems. Satellite communications systems generally possess sufficient bandwidth to handle such backhaul traffic. One drawback of satellite networks, however, is a relatively long signaling delay and higher costs per bit, as compared to terrestrial links. One solution that aids in reducing the delay factor in satellite networks is acceleration technology, such as performance enhancing proxies (PEPS) and HyperText Transfer Protocol (HTTP) acceleration techniques. PEP and HTTP acceleration techniques, however, cannot be directly applied to the mobile network backhaul traffic, because the traffic is carried over multiple GTP flows.

US. Pat. No. 10,021,594 discloses a satellite communication system configured to establish multiple different tunnels between a first satellite modem and a second satellite modem in accordance with a protocol. The first satellite modem may receive a packet via a tunnel established in accordance with a different protocol. It may then determine an endpoint identifier corresponding to the tunnel based on information from one or more headers included in the packet, identify one of the multiple different tunnels that corresponds to the tunnel, generate a corresponding packet omitting at least a portion of the information from the one or more headers and comprising at least a portion of data included in a payload of the packet and an information block comprising a tunnel index corresponding to the identified one of the multiple different tunnels, and transmit the corresponding packet to the second satellite modem via the identified one of the multiple different tunnels. There is, however, no reduction in the Transmission Control Protocol (TCP) set-up time or any reduction in the delay of sending a first data payload.

U.S. Pat. No. 10,057,391 discloses an application of network acceleration technologies to remote node traffic over GPRS tunneling protocols (GTP) in terrestrial mobile communications networks. A proxy device of a first network node receives a stream of data packets that are encapsulated in accordance with GTP. Each GTP packet is de-encapsulated by stripping the GTP header from the packet, identifying the tunnel endpoint identifier (TEID) which reflects a respective GTP flow with which the GTP packet is associated, and maintaining a respective GTP payload (PDU). Acceleration functions are applied to the GTP PDUs, and the resulting acceleration packets are transmitted on communications network link(s) to a proxy of a second network node. The second node proxy device receives the transmitted packets, and re-encapsulates each packet, in accordance with the GTP protocol, based at least in part on the respective TEID of the packet. However, the application of network acceleration technologies disclosed by this reference only applies to single bearer network arrangements.

CN103369710 discloses a method, system and device for establishing a direct tunnel. When determining that the direct tunnel needs to be established, a serving-gateway (SGW) sends the IP address and TEID of a local packet data network gateway/packet data network gateway (L-PGW/PGW) to a base station and sends the IP address and the TEID to the PGW/L-PGW so that the base station and the PGW/L-PGW may establish the direct tunnel according to the opposing IP address and the TEID which are sent by the SGW. The data required to be transmitted by user equipment may be sent to the PGW/L-PGW through the direct tunnel established between the base station and the PGW/L-PGW. The SGW does not need to encapsulate and de-encapsulate data so that the flow load of the SGW is relieved, and at the same time, the transmission time delay of the data is reduced. There is, however, no reduction in the TCP set-up time.

Thus, there remains a need for at least a method which can improve the TCP efficiency in multiple GTP flows for carrying user data packets (user traffic) over a high latency network connection or a backhaul network in a communications network.

Objects of the Invention

An object of the invention is to mitigate or obviate to some degree one or more problems associated with known methods of using a high latency network connection or a high latency backhaul network in a communications network.

The above object is met by the combination of features of the main claims; the sub-claims disclose further advantageous embodiments of the invention.

Another object of the invention is to mitigate or obviate to some degree one or more problems associated with the lack of TCP efficiency in multiple GTP flows in a high latency network connection or a high latency backhaul network in a communications network.

Another object of the invention is to mitigate or obviate to some degree one or more problems associated with the delay in sending a first data payload over a high latency network connection or a high latency backhaul network in a communications network.

Another object of the invention is to mitigate or obviate to some degree one or more problems associated with the delay in establishing connections over a high latency network connection or a high latency backhaul network in a communications network.

One skilled in the art will derive from the following description other objects of the invention. Therefore, the foregoing statements of object are not exhaustive and serve merely to illustrate some of the many objects of the present invention.

SUMMARY OF THE INVENTION

The invention relates to a method and an apparatus for reducing connection set-up time in a communications network and, more particularly, to reducing connection set-up time over a high latency network connection and/or a high latency backhaul network in a communications network. The invention particularly concerns setting-up a tunnel connection for transporting data packets over a high latency network connection and/or a backhaul network with GTP data traffic tunnels in a communication network and particularly, but not exclusively, for setting-up a tunnel connection over a high latency network connection and/or a high latency backhaul network in such a communications network. The invention also relates to a method and an apparatus for improving the Transmission Control Protocol (TCP) efficiency in a wireless communication network having a high latency network connection and/or a high latency backhaul network.

Herein, a reference to a high latency network connection can be taken to also be a reference to a high latency backhaul network and vice-versa.

In a first main aspect, the invention provides a method for setting-up a tunnel connection for transporting data packets over a high latency network connection in a communication network, the method comprising the step of, at a module or node configured on a tunnel connection initiator side of the high latency network connection, using a non-TCP connection to encapsulate a set-up connection message for sending to a module or node configured on a core network (CN) side of the high latency network connection to set-up a data packet transport tunnel connection between the initiator side of the high latency network connection and the core network (CN) side of the high latency network connection.

In a second main aspect, the invention provides a method for setting-up a tunnel connection for transporting data packets over a high latency network connection in a communication network, the method comprising the step of, at a module or node configured on a core network (CN) side of the high latency network connection, receiving from a node or module configured on a connection initiator side of the high latency network connection a set-up connection message encapsulated in a non-TCP connection to offset-up a data packet transport tunnel connection between the core network (CN) side of the high latency network connection and the initiator side of the high latency network connection.

In a third main aspect, the invention provides a communication network node for setting-up a tunnel connection for transporting data packets over a high latency network connection in a communication network, the node comprising a TCP proxy (TP) module configured on a tunnel connection initiator side of the high latency network connection, said TP module configured to use a non-TCP connection to encapsulate a set-up connection message for sending to a TP module configured on a core network (CN) side of the high latency network connection to establish a data packet transport tunnel connection between the TP modules.

In a fourth main aspect, the invention provides a communication network node for setting up a tunnel connection for transporting data packets over a high latency network connection in a communication network, the node comprising a TCP proxy (TP) module configured on a core network (CN) side of the high latency network connection, said TP module configured to receive a non-TCP connection encapsulating a set-up connection message from a TP module configured on a tunnel connection initiator side of the high latency network connection to establish a data packet transport tunnel connection between the TP modules.

The summary of the invention does not necessarily disclose all the features essential for defining the invention; the invention may reside in a sub-combination of the disclosed features.

BRIEF DESCRIPTION OF THE DRAWINGS

The foregoing and further features of the present invention will be apparent from the following description of preferred embodiments which are provided by way of example only in connection with the accompanying figures, of which:

FIG. 2 is a diagram illustrating by way of example only an access network for embodiments of the present invention;

FIG. 3 illustrates a base station or eNodeB for embodiments of the invention;

FIG. 4 illustrates a UE for embodiments of the invention;

FIG. 6 illustrates an embodiment of a wireless communication architecture in accordance with the present invention;

FIG. 7 illustrates the signal flows in the embodiment of FIG. 6;

FIG. 8 illustrates the logical structure and process steps performed by gateway modules or nodes in accordance with the invention when setting-up a tunnel connection there-between;

FIG. 9 illustrates the process steps performed by the gateway modules or nodes of FIG. 8 when sending data packets over the tunnel connection there-between;

DESCRIPTION OF PREFERRED EMBODIMENTS

Figure 1:
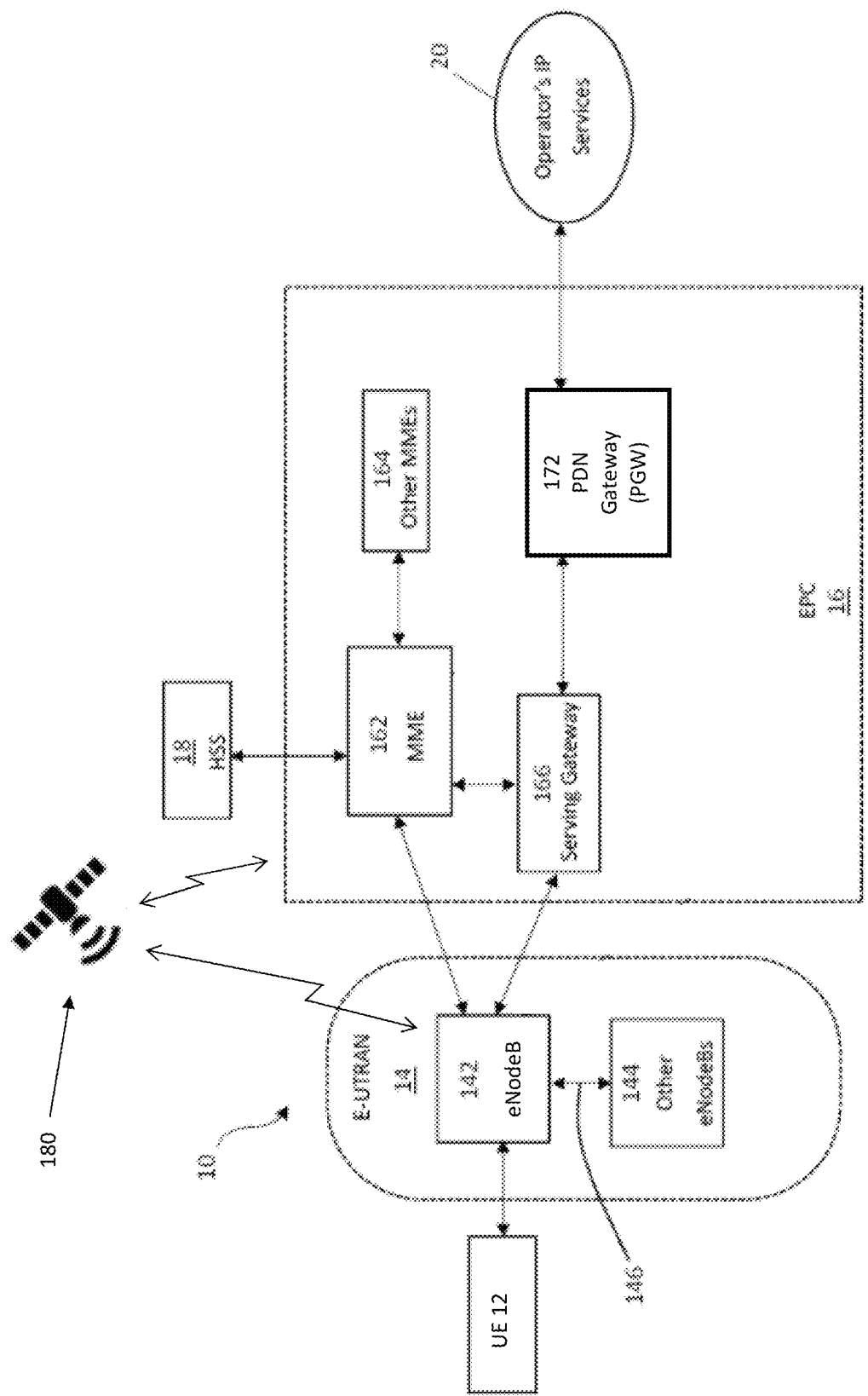
FIG. 1 is a diagram illustrating by way of example only a network architecture for embodiments of the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the Figures, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The present invention will be described with respect to a wireless communications network by way of example only, but it will be understood that the principles of the invention as disclosed herein are equally applicable to any type of communications network having one or more high latency network connections whether of a legacy network connection type or specifically of a high latency backhaul network connection type such as, for example, a satellite network connection or a transcontinental fiber network connection.

FIG. 1 is a diagram illustrating, merely by way of example only, an LTE network architecture 10 in which the methods of the present invention can be performed, but it will be understood by one skilled in the art that the methods may be performed in other network architectures including non-wireless communication network architectures. The LTE network architecture 10 of FIG. 1 may be referred to as an Evolved Packet System (EPS) 10. The EPS 10 may include one or more user equipment (UE) 12, an Evolved UMTS Terrestrial Radio Access Network (E-UTRAN) 14, a core network (CN) comprising an Evolved Packet Core (EPC) 16, a Home Subscriber Server (HSS) 18, and an Operator's Internet Protocol (IP) Services 20. The EPS 10 can interconnect with other access networks, but for simplicity those entities/interfaces are not shown. As shown, the EPS provides packet-switched services.

The E-UTRAN 14 includes an eNodeB 142 and other eNodeBs 144. The eNodeB 142 provides user and control plane protocol terminations toward the UE 12. The eNodeB 142 may be connected to the other eNodeBs 144 via a backhaul (e.g., an X2 interface) 146. The eNodeB 142 may also be referred to herein as a BS, a Node B, an access point, a TRP, a base transceiver station, a radio base station, a radio transceiver, a transceiver function, a basic service set (BSS), an extended service set (ESS), or some other suitable terminology. The eNodeB 142 provides an access point to the EPC 16 for a UE 12. Examples of a UE 12 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 142 is connected to the EPC 16. Typically, the eNodeB 142 is connected to the EPC 16 by a short range air interface and/or by low latency coaxial or fiber optic cables, but, in some network architectures where the eNodeBs 142 are widely spread geographically, one or more eNodeBs 142 may be connected to the EPC 16 via a high latency backhaul network such as, for example, a satellite network 180. The EPC 16 may include a Mobility Management Entity (MME) 162, other MMEs 164, a Serving Gateway 166, and a Packet Data Network Gateway (PGW) 172. The MME 162 is the control node that processes the signaling between the UE 12 and the EPC 16. Generally, the MME 162 provides bearer and connection management. All user IP packets are transferred through the Serving Gateway 166, which itself is connected to the PGW 172. The PGW 172 provides UE IP address allocation as well as other functions. The PGW 172 is connected to the Operator's IP Services 20. The Operator's IP Services 20 may include the Internet, an intranet, an IP Multimedia Subsystem (IMS), and a PS Streaming Service (PSS).

FIG. 2 is a diagram illustrating an example of an access network 200 in an LTE network architecture such as that described with respect to FIG. 1. In this example, the access network 200 is divided into a number of cellular regions (cells) 202. There is no centralized controller in this example of an access network 200, but a centralized controller may be used in some configurations. The eNodeBs 204 may be configured to provide all radio related functions including radio bearer control, admission control, mobility control, scheduling, security, and connectivity to the serving gateway 166. An eNodeB may support one or multiple cells (also referred to as a sector). The term "cell" can refer to the smallest coverage area of an eNodeB and/or an eNodeB subsystem serving a particular coverage area. Further, the terms "eNodeB," "base station," and "cell" may be used interchangeably herein.

FIG. 3 illustrates a basic structure of an eNodeB 300 for implementing the methods of the invention. The eNodeB 300 has at least one or a small number of antennas but may comprise a massive number of 100 or more antenna elements 302 (only a small number of antenna elements are shown for clarity of the drawing), a communications module 304 for communicating wirelessly with a UE and communicating with other components of a wireless communication system. The eNodeB 300 is also provided with a non-transitory memory 306 storing machine-readable instructions for execution by a processor 308. When executing the machine instructions, the processor 308 configures the BS 300 to implement the methods of the invention.

FIG. 4 illustrates a basic structure of a UE 400 for implementing the methods of the invention. The UE 400 comprises at least one antenna 402 but may include multiple antennas 302 or even a massive number of 100 or more antenna elements 402. It is also provided with a communications module 404 for communicating wirelessly with one or more eNodeBs 300. The UE 400 also has a non-transitory memory 406 storing machine-readable instructions for execution by a processor 408. When executing the machine instructions, the processor 408 configures the UE 400 to implement the methods of the invention.

Figure 5:
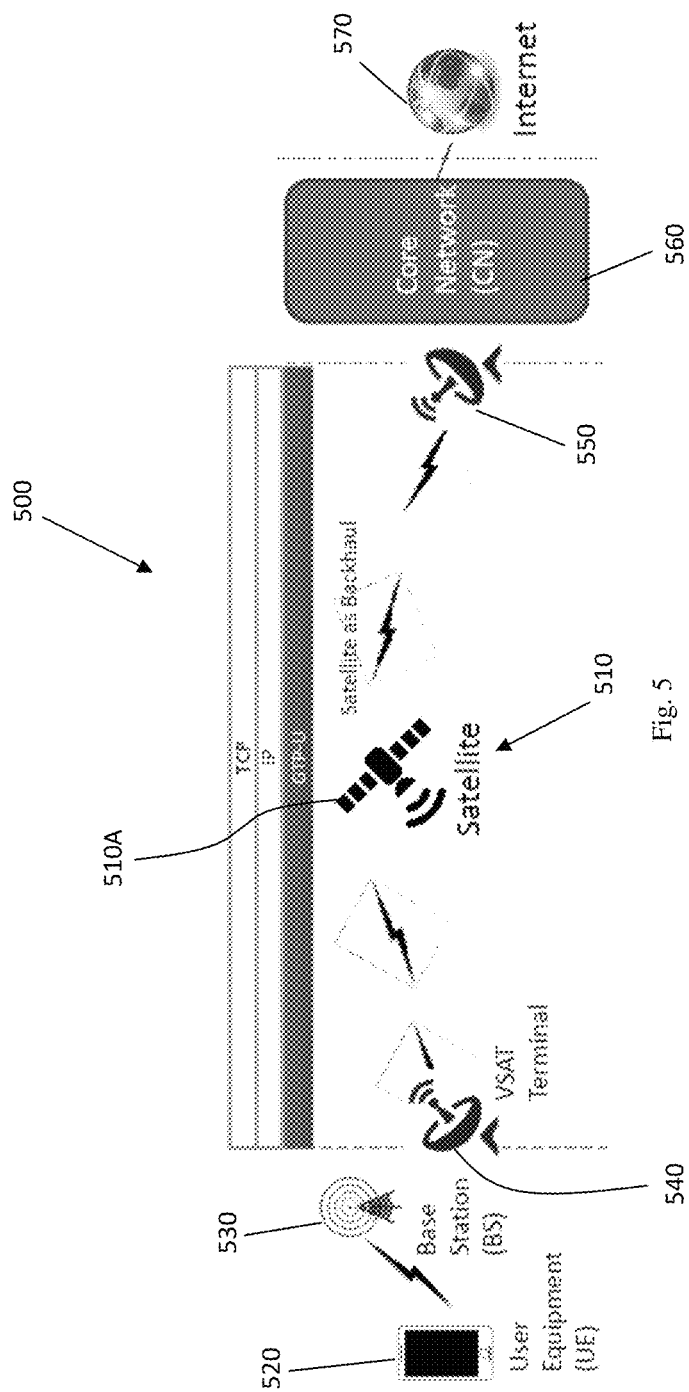
FIG. 5 illustrates a typical wireless communication network architecture including a high latency satellite backhaul network.

Referring to FIG. 5, there is illustrated a known wireless communication network architecture 500 including a high latency satellite backhaul network 510. This network architecture 500 is provided by way of example only to illustrate one or more of the problems which may arise in a communication network utilizing a high latency network connection such as, for example, a high latency backhaul network 510. The satellite backhaul network 510 may be utilized to connect one or more UEs 520 to the CN 560 via one or more eNodeBs 530. As such, the eNodeBs 530 connect, on a connection initiator side of the backhaul network 510, to a terrestrial satellite (VSAT) terminal 540 of the satellite network 510. On a CN side of the backhaul network 510, a satellite network ground station 550 connects to the CN 560. The CN 560 may, in turn, be connected to an Operator's Internet Protocol (IP) Services 570.

In this typical arrangement of a high latency backhaul network in a wireless communication network, one problem which arises is the high latency before first user data packets can be sent over the backhaul network. This is due to the need to employ a Transport Control Protocol (TCP) three-way handshake (also known as the TCP-handshake, the three-way handshake and/or the SYN/SYN-ACK/ACK). This is the method used by TCP to set-up a TCP/IP connection over an IP based network such as, in this case, the satellite backhaul network 510. Typically, in such a backhaul network 510, each hop comprising the VSAT 540 to satellite 510A to ground station 550 has a one-way delay of about 250 ms. Consequently, the three messages of the three-way handshake require about 750 ms such that a first TCP payload round trip will require an additional 250 ms for a total of about 1000 ms. It is evident that such a delay will dramatically decrease the user's experience given that most normal web applications require multiple short TCP connections to load a single web page. This also leads to a further problem of low TCP data packet throughput compared to the available data bandwidth on the backhaul network 510.

There is a need therefore to develop a method to facilitate acceleration over a high latency backhaul network in a communications network to achieve one or more of the objectives of: reducing the latency of the TCP connection set-up; reducing the latency of sending of the first TCP user data packets (payload); and/or reducing the latency of the TCP payload first round trip.

As illustrated in FIG. 6, the invention seeks to mitigate or obviate one or more of the aforementioned problems to achieve one or more of the aforementioned objectives by configuring, in this example, a wireless communication network 600 utilizing a high latency backhaul network such as a satellite network 610 to have a pair of gateway (GW) modules or nodes (hereinafter "GW nodes") to proxy the TCP set-up process on behalf of an opposing end-point, for example, to have a UE or eNodeB establish a TCP connection on behalf of a TCP server and vice-versa using a non-TCP transport connection for set-up and user data packet transmission between the GW nodes to avoid the negative effects of operating TCP over a high latency link.

As shown in FIG. 6, a first GW node (GW1) 690 is provided on a CN side of the backhaul network 610 and a second GW node (GW2) 680 is provided on a connection initiator, i.e. eNodeB 630, side of the backhaul network 610. In each case, GW1 690 and GW2 680 may comprise newly installed network elements, but preferably GW1 690 and/or GW2 680 are configured by way of modification of an existing network element on their respective sides of the backhaul network 610. This modification may merely amount to programming suitable machine code instructions into the existing network element to cause said existing network element, when the machine code instructions are executed, to implement the steps of the method taught herein. For example, the functions of GW2 680 may be implemented by any of software, firmware and/or hardware in an eNodeB 630 or an existing GW provided for another purpose such as traffic aggregation, for example. The functions of GW1 690 may be implemented by any of software, firmware and/or hardware in one of the CN network elements such as, for example, the MME 162 (FIG. 1).

FIG. 7 illustrates the signal and connection flows for implementing the method of the invention in the wireless communication network 600 of FIG. 6. In FIG. 7, it will be seen that GW2 680 comprises a CP 710, a DP 730 and a TCP proxy (TP) module 750 and GW1 690 comprises a CP 720, a DP 740 and a TCP proxy (TP) module 760. All user payload data, i.e. TCP packets, are encapsulated in GTP tunnels in the DP within the LTE wireless communications network 600. Each GTP tunnel is identified by a pair of TEIDs. Different services of a user will be carried on different channels, also known as bearers, and the present invention facilitates the use of multiple bearers whereby each bearer will have an associated tunnel, i.e. a pair of TEIDs. The TEIDs are assigned and exchanged through S1 Application Protocol (S1AP) messages through the CPs 710, 720 between the eNodeB 630 and the CN 660. Each network element or entity assigns its own TEIDs.

The CPs 710, 720 are configured to assign and acquire TEIDs for the tunnel end points, whereas the DPs 730, 740 are configured to store the TEIDs in mapped pairs and to encapsulate and de-encapsulate the GTP tunnels. The TP modules 750, 760 are configured to handle the TCP connection set-up in GW1 and GW2.

It will be understood that the TP modules 750, 760 may be implemented through software, firmware and/or hardware in their respective GW nodes.

Generally speaking, each of GW1 and GW2 comprises:
- a CP process (FIG. 10) that participates in the signaling exchange to acquire the data tunnel end point information (TEIDs) with the peer nodes;
- a DP process (FIG. 13) that encapsulates and de-encapsulates the data tunnel headers and forwards data packets between the eNodeBs, core network and the TP modules with the provided tunnel end point mappings; and
- a TP module. In GW2, the TP provided at the connection initiator side of the backhaul network is configured to set-up a connection with the peer gateway (GW1) and terminate the TCP connection with the connection initiator (eNodeB) to reduce latency in the connection set-up and to provide reliable data transport over the backhaul network.

More particularly, the functions of GW1 and GW2 can be better understood from FIGS. 8 to 13.

Figure 8:
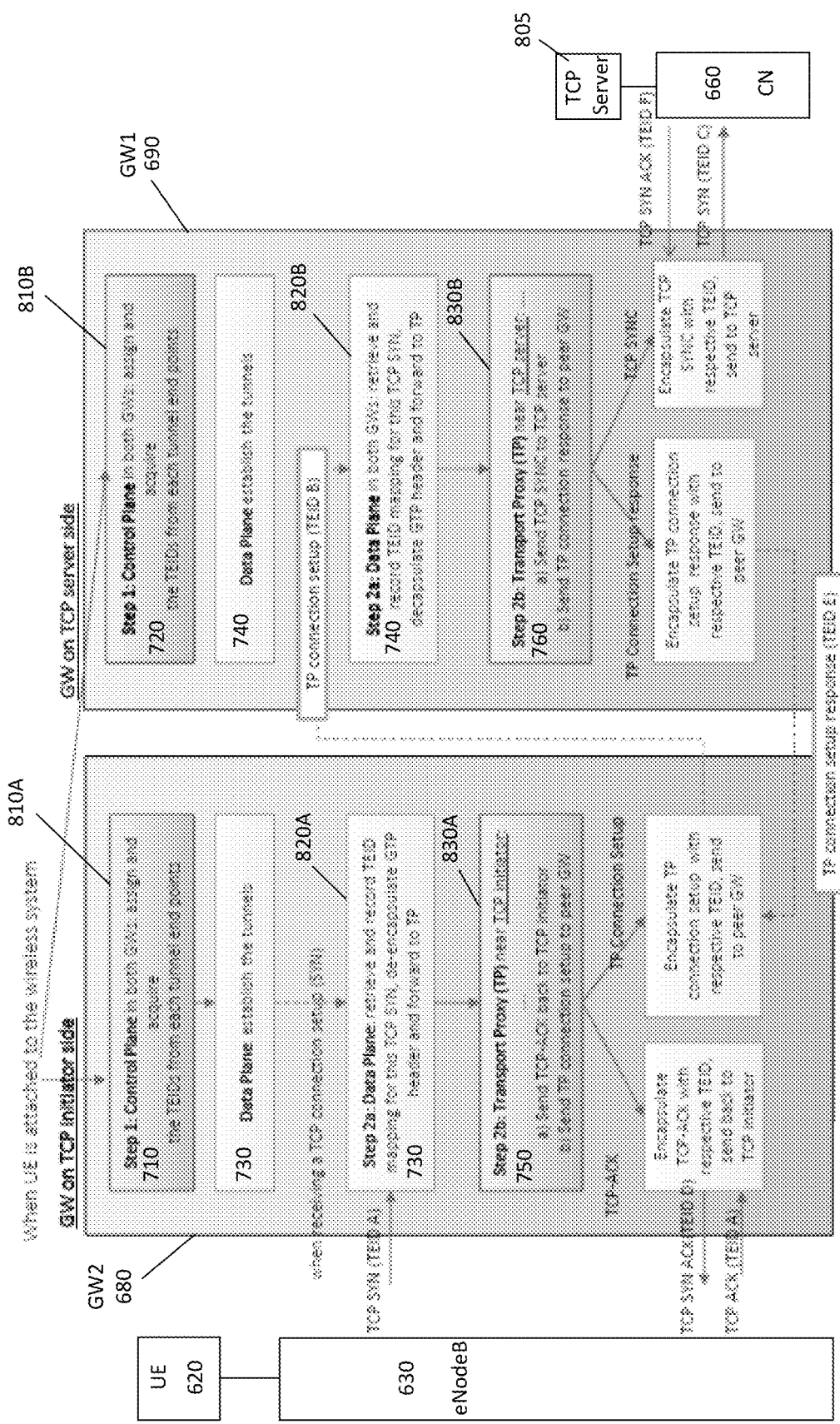

FIG. 8 illustrates the data packet flows and steps between GW2 and GW1 and the adjacent network elements or nodes when the wireless communications network is configured in accordance with the present invention to receive a connection request from a UE.

Referring to FIG. 8, in a first step (Step 1) 810A, B, the respective CPs 710, 720 of GW2, GW1 assign a local TEID and receive a peer TEID. The CPs 710, 720 do this for each of the three tunnels between the connection initiator 620/630 and the CN 660 denoted respectively as "Segment 1", "Segment 2" and "Segment 3" in FIG. 7. The DPs 730, 740 use the TEIDs to establish the tunnels. For example, when a UE 620 powers on and registers with the CN 660, the CP 710 of GW2 680 assigns a local DL TEID for the tunnel between GW2 and the connection initiator in response to receiving a peer UL TEID for the tunnel between the connection initiator and GW2 and then sends these TEIDs as a mapped pair of TEIDs to DP 730 to enable the DP 730 to set-up the respective tunnel, e.g. "Segment 1" in FIG. 7. Each mapped pair of TEIDs relates to a tunnel for a respective bearer which enables each bearer to be separately identified. This also enables each bearer for a UE, for example, to be separately identified as well as the relationship of said bearers to said UE to be known.

In a second step (Step 2a) 820A, B, the respective DPs 730, 740 of GW2, GW1, in response to receiving a connection set-up message, record the TEID mappings for the tunnel segments, de-encapsulate the GTP headers and forward these to their respective TP modules 750, 760. In the case of step 820A, the received connection set-up message comprises a TCP SYN message from the eNodeB 630 whereas, in the case of step 820B, the received connection set-up message received at DP 740 is received from TP module 750 of GW2 and comprises a TP connection set-up message encapsulated or transmitted in a non-TCP connection between GW2 and GW1. The non-TCP connection between GW2 and GW1 may be provisioned by using a private transport protocol connection. This may comprise any one or more of: a proprietary private transport protocol connection, a multi-homing protocol connection, a multi-streaming protocol connection which may include multiple streams used independently which prevents control packets becoming blocked by data packets, and a Stream Control Transport Protocol (SCTP) connection.

In a third step (Step 2b) 830A, B, the TP module 750 of GW2 sends (step 830A) a TCP-ACK message back to the TCP connection initiator and sends the TP connection set-up message encapsulated or transmitted in a non-TCP connection to GW1, more particularly to DP 740 of GW1. The TCP-ACK message sent back to the TCP connection initiator is encapsulated with the respective DL TEID for the tunnel ("Segment 1") between GW2 and the connection initiator and the TP connection set-up message sent to DP 740 includes the respective UL TEID for the tunnel segment between GW2 and GW1, e.g. "Segment 2" in FIG. 7. Also, in the third step, the TP module 760 of GW1 sends (step 830B) a TCP-SYN message to a network element such as TCP server 805 and sends a TP connection response message to GW2, more particularly to TP module 750 of GW2. The TCP-SYN message sent to the TCP server 805 is encapsulated with the respective UL TEID for the tunnel segment between GW1 and the CN 660 and the TP connection response message sent to TP 750 includes the respective DL TEID for the tunnel segment between the CN 660 and GW1, e.g. "Segment 3" in FIG. 7.

It can be seen therefore that the messaging process comprises a TCP three-way handshake between the UE 620 and GW2 680, a non-TCP connection between GW2 and GW1 and a TCP three-way handshake between the GW1 690 and the TCP server 805.

Figure 9:
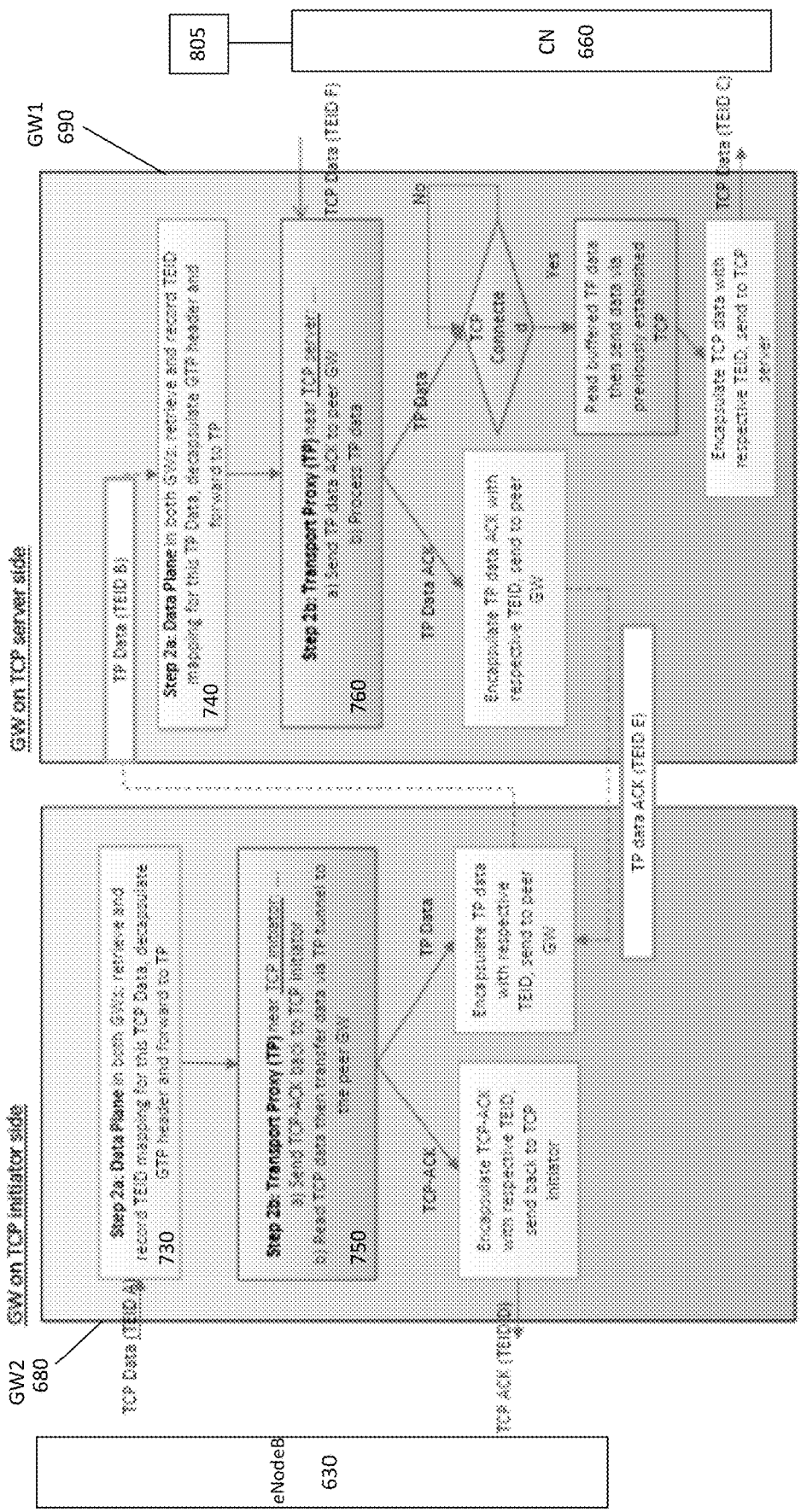

FIG. 9 illustrates the data packet flows and steps between GW2 and GW1 and the adjacent network elements when the wireless communications network is configured in accordance with the present invention to receive and transmit payload data.

Referring to FIG. 9, it can be seen that, when TCP data is received by the DP 730 of GW2 680, the DP 730 retrieves and records the TEID mapping for the TCP data, de-encapsulates the GTP header and forwards the TCP data to the TP module 750. The TP module 750 encapsulates a TCP-ACK message with the respective TEID and sends this back to the TCP connection initiator. The TP module 750 also reads the TCP data as TP data and transfers the TP data via a TP connection or tunnel to GW1 690. To send the TP data, the TP module 750 encapsulates the TP data with a respective TEID and send the data to GW1 690.

In GW1 690, the DP 740 retrieves and records the TEID for the received TP data, de-encapsulates the GTP header and forwards the TP data to the TP module 760. The TP module 760 sends a TP data ACK message back to GW2 680 by encapsulating the TP data ACK message with a respective TEID and sends said encapsulated TP data ACK message via a TP connection or tunnel to GW2 680. TP module 760 also processes the received TP data, determines if a TCP connection is already established and, if so, encapsulates said TP data as TCP data with a respective TEID for sending to the TCP server 805.

Figure 10:
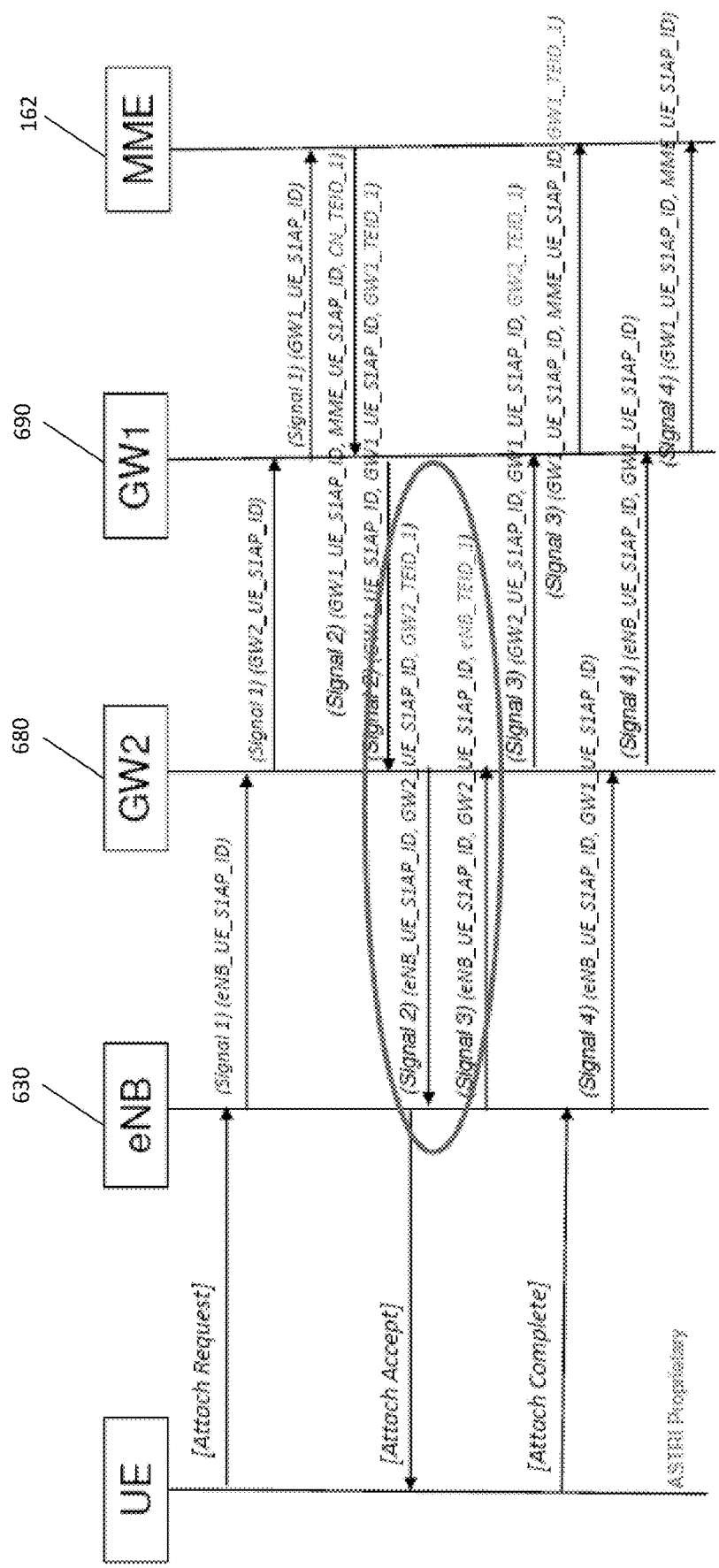
FIG. 10 illustrates the signaling exchanges to acquire the data tunnel end point identifiers (TEIDs) with peer nodes.

The manner by which TEIDs are set-up and mapped in accordance with the method of the invention can be better understood from FIG. 10.

In response to an "attach request" message from a UE, eNodeB 630 sends a first signal comprising a TCP signal to GW2 680. This signal includes a control identifier "eNB_UE_S1AP_ID" assigned by the eNodeB 630 for the UE. The eNodeB 630 records this identifier. On receiving the first signal from the eNodeB 630, GW2 680 records the eNodeB assigned control identifier and issues a corresponding first signal to GW1 690. This corresponding first signal includes a control identifier "GW2_UE_S1AP_ID" assigned by GW2 680 for the same UE. GW2 680 also records its own assigned control identifier. On receiving the corresponding first signal from GW2 680, GW1 690 records the GW2 assigned control identifier and issues a corresponding first signal to MME 162 of CN 660. This corresponding first signal includes a control identifier "GW1_UE_S1AP_ID" assigned by GW1 690. GW1 690 also records its own assigned control identifier.

On receiving the corresponding first signal from GW1 690, the MME 162 records the control identifier assigned by GW1 690 and then responds with a second signal which carries the control identifier assigned by GW1 690, a control identifier assigned by MME 162 and a TEID assigned by MME 162 for a tunnel between MME 162 and GW1 690, i.e. the second signal carries "GW1_UE_S1AP_ID, MME_UE_S1AP_ID, CN_TEID_1". MME 162 records the mapping between the control identifiers and TEID carried in the second signal. Upon receipt of the second signal at GW1 690, GW1 updates its record to record the mapping between the control identifiers and TEID in the received second signal and then issues a corresponding second signal to GW2 680. This corresponding second signal carries the previously assigned control identifier of GW2, the previously assigned control identifier of GW1 and a TEID assigned by GW1 for a tunnel between GW1 and GW2, i.e. the corresponding second signal carries "GW2_UE_S1AP_ID, GW1_UE_S1AP_ID, GW1_TEID_1". GW1 updates its record to record this mapping also. Upon receipt of the corresponding second signal at GW2 680, GW2 updates its record to record the mapping between the control identifiers and TEID in the received corresponding second signal and then issues another corresponding second signal to eNodeB 630. This corresponding second signal carries the previously assigned control identifier of eNodeB, the previously assigned control identifier of GW2 and a TEID assigned by GW2 for a tunnel between GW2 and eNodeB, i.e. the another corresponding second signal carries "eNB_UE_S1AP_ID, GW2_UE_S1AP_ID, GW2_TEID_1". GW2 updates its record to record this mapping also.

Upon receipt of the another corresponding second signal at eNodeB 630, eNodeB 630 records the mapping between the control identifiers and TEID. eNodeB 630 then issues a third signal to GW2 680 which carries the previously assigned eNodeB control identifier, the previously assigned GW2 control identifier and a TEID assigned by the eNodeB for the tunnel between GW2 and eNodeB. The eNodeB records this mapping also. Consequently, both TEID end-points for the tunnel between GW2 and eNodeB are now established and mapped to each other as well as mapped to the respective control identifiers.

The third signal when received at GW2 680 causes GW2 to record the mapping between the two TEID endpoints for the tunnel between GW2 and eNodeB and the previously assigned eNodeB control identifier and the previously assigned GW2 control identifier. GW2 then issues a corresponding third message to GW1 690 which carries the previously assigned control identifier for GW2, the previously assigned control identifier for GW1 and a TEID assigned by the GW2 for the tunnel between GW1 and GW2, i.e. the corresponding third message carries "GW2_UE_S1AP_ID, GW1_UE_S1AP_ID, GW2_TEID_1". GW2 records this mapping also. Consequently, both TEID endpoints for the tunnel between GW1 and GW2 are now established and mapped to each other as well as mapped to the respective control identifiers.

The corresponding third signal when received at GW1 690 causes GW1 to record the mapping between the two TEID endpoints for the tunnel between GW1 and GW2 and the previously assigned GW2 control identifier and the previously assigned GW1 control identifier. GW1 then issues another corresponding third message to MME 162 which carries the previously assigned control identifier for GW1, the previously assigned control identifier for MME and a TEID assigned by the GW1 for the tunnel between MME and GW1, i.e. the another corresponding third message carries "GW1_UE_S1AP_ID, MME_UE_S1AP_ID, GW1_TEID_1". GW1 records this mapping also. Consequently, both TEID endpoints for the tunnel between MME and GW1 are now established and mapped to each other as well as mapped to the respective control identifiers.

Each of eNodeB 630, GW2 680, GW1 690 and MME 162 record their respective tunnel mappings such that each can communicate over the tunnels forming a connection from the eNodeB 630 to the MME 162. The above described process explains how a set of three tunnels across the network can be set-up and established for a bearer for a UE. Further bearers for a same UE can be established with respective control identifiers and TEID mappings such that it is possible to identify which of multiple bearers relate to which UEs.

Figure 11:
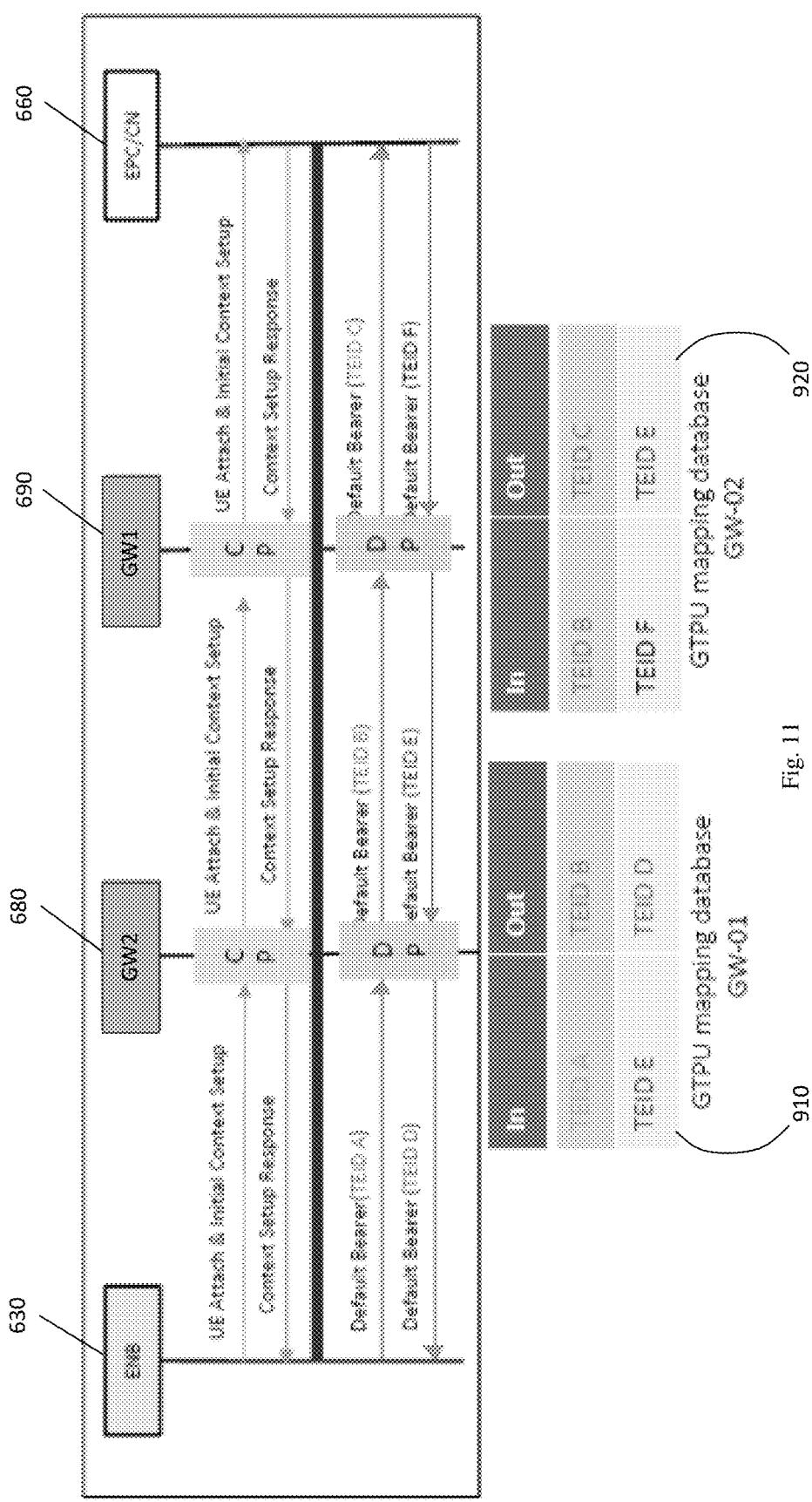
FIG. 11 illustrates the mapping of TEIDs in accordance with the invention.

FIG. 11 further illustrates the connection setup messages and the TEID mappings stored by at least GW2 680 and GW1 690. The TEID mappings may be stored in respective databases 910, 920 of GW2 and GW1.

Figure 12:
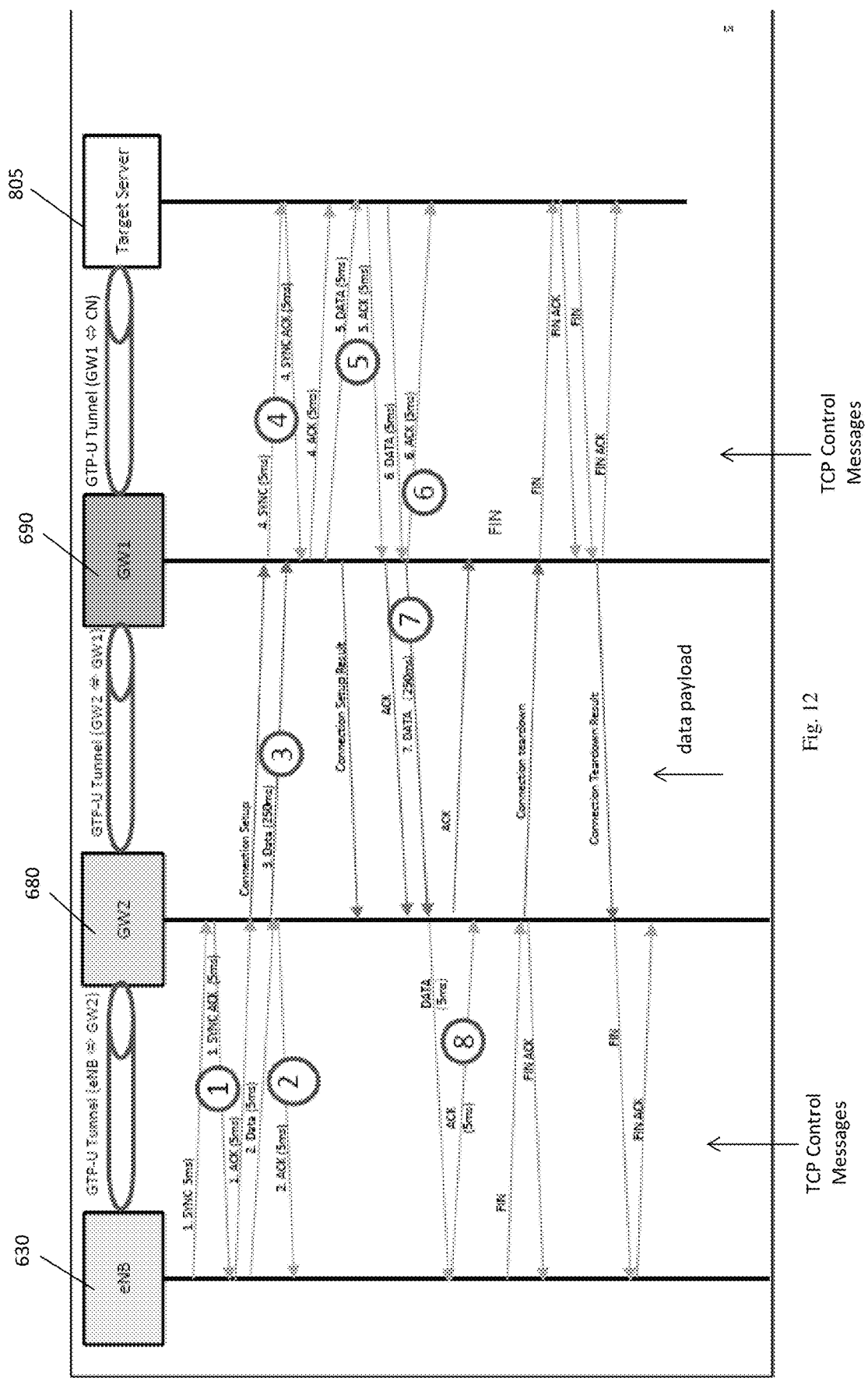
FIG. 12 illustrates the signal flows between wireless communications network elements in accordance with the invention.

FIG. 12 illustrates the signal flows between wireless communications network elements in accordance with the invention with the main signals or sets of signals comprising:
 1. TCP Client Set-up time (15 ms)
 2. HTTP Request Transfer time at TCP Client (10 ms)
 3. Tunnel Data transfer time (250 ms)
 4. TCP Server Set-up time (15 ms)
 5. HTTP Request Transfer time at TCP Server (10 ms)
 6. HTTP Result Transfer time at TCP Server (10 ms)
 7. Tunnel Data transfer time (250 ms)
 8. HTTP Result Transfer Time at TCP Client (10 ms)

It can be seen that the three signals comprising "1. TCP Client Set-up time" above comprise a TCP three-way handshake between the eNodeB 630 and GW2 680. As the signals comprising this TCP three-way handshake are carried only on a low latency part of the communications network, the delays inherent for a TCP three-way handshake over a high latency backhaul network are avoided. It will be also noted that, immediately the TCP three-way handshake is completed, a single connection set-up message is transmitted from GW2 680 to GW1 690. The connection between GW2 680 and GW1 690 does not employ the TCP three-way handshake, but instead employs a signal message to initiate a TCP three-way handshake between GW1 690 and the target TCP server 805. Once again, this latter TCP three-way handshake is carried on a low latency part of the communications network. Consequently, only a single connection initiation message is required on the high latency part of the communications network to initiate the latter TCP three-way handshake between GW1 690 and the target TCP server 805. The overall set-up connection time is greatly reduced compared to a conventional TCP three-way handshake between eNodeB 630 and TCP server 805.

It should be noted that by encapsulating the SYN-ACK message from GW1 to the connection initiator at the signal denoted as 1 in FIG. 11, it is possible to immediately send TCP payload from GW2 to GW1 at the signal denoted as 3 in FIG. 11. Thus, it can be seen that transmission of payload data can be commenced before all connection set-up messages have been processed thereby reducing the delay time for first payload data transmission.

It will be seen that the total time for connection set-up and sending of first payload data is not more than 570 ms which compares very favourably with the conventional TCP payload round trip time of about 1000 ms when using a conventional TCP three-way handshake across the high-latency part of the network.

Figure 13:
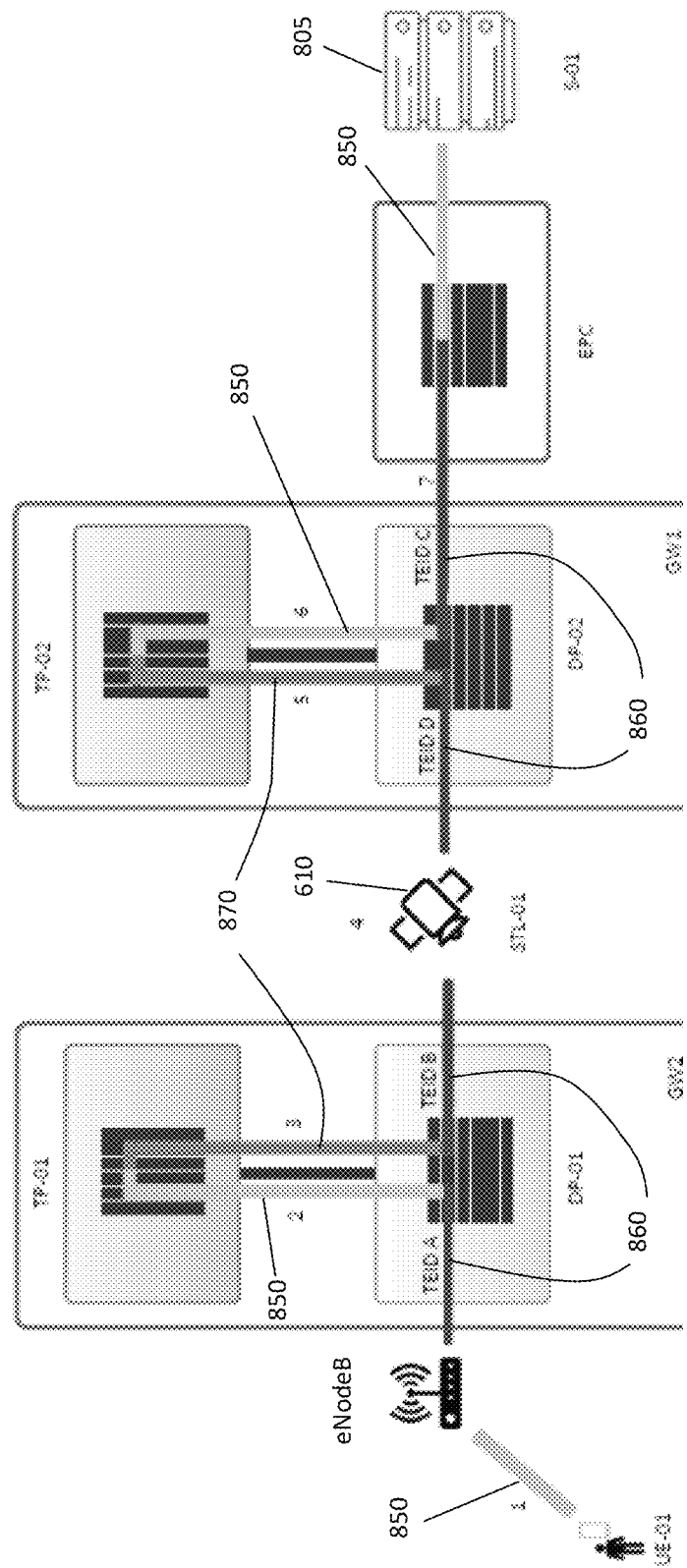
FIG. 13 illustrates the signal and tunnel connections between wireless communications network elements in accordance with the invention.

FIG. 13 further illustrates the signal and tunnel connections between wireless communications network elements in accordance with the invention. TCP connections are denoted by numeral "850", GTP-U tunnels by numeral "860" and private transport protocol connections, e.g. SCTP GW-GW tunnel connections, by numeral "870". The connections comprise:
 1. UE-01 initiates a TCP connection to S-01. TCP packets are encapsulated in GTP TEID A by eNodeB and then sent to DP-01
 2. DP-01 de-encapsulates GTP tunnel, records TEID A in meta data of packet then sends TCP packet to TP-01
 3. TP-01 intercepts the TCP packet and transfers the TCP payload by a non-TCP connection, e.g. a private transport protocol connection
 4. TCP payload packets are encapsulated in a GTP tunnel (TEID B) which is identified from previously recorded TEID in meta data
 5. DP-02 de-encapsulates the GTP tunnel, records TEID in meta data of packet then sends TCP payload packets to TP-02
 6. TP-02 transforms the TCP payload packets back to a TCP packet then sends to DP-02
 7. DP-02 encapsulates the TCP packet back to a GTP tunnel (TEID C) again according to TEID recorded in meta data then sends to EPC-01.

For packets in the reverse direction, the GTP packets from TEID D to TEID B will be de-encapsulated and DP-01 encapsulates the TCP back to the GTP tunnel (TEID A).

The invention as described herein therefore provides a method for setting-up a tunnel connection for transporting data packets over a backhaul network in a communication network, the method comprising the step of, at a module or node configured on a tunnel connection initiator side of the backhaul network, using a non-TCP connection, e.g. a private transport protocol connection over GTP, to encapsulate a set-up connection message for sending to a module or node configured on a core network (CN) side of the backhaul network to initiate setting-up of a data packet transport tunnel connection between the initiator side of the backhaul network and core network (CN) side of the backhaul network. A non-TCP connection, e.g. a private transport protocol connection over GTP, may comprise a SCTP connection or a proprietary protocol connection.

Preferably, the set-up connection message to be sent to the CN side module or node includes an uplink (UL) tunnel endpoint identifier (TEID) assigned by the initiator side module or node for a tunnel to be set-up between the initiator side module or node and the CN side module or node.

The method preferably further comprises the step of receiving at said initiator side module or node a connection set-up response message from said CN side module or node, said connection set-up response message being encapsulated using a non-TCP connection, wherein said connection set-up response message includes a DL TEID for a tunnel to be set-up between the CN side module or node and said initiator side module or node.

Also, the method preferably includes mapping the UL TEID assigned by the initiator side module or node for the tunnel between the initiator side module or node and the CN side module or node with the DL TEID for the tunnel between the CN side module or node and said initiator side module or node.

The method preferably includes the steps at said initiator side module or node of receiving an encapsulated TCP synchronize (TCP-SYN) message from said connection initiator, said TCP-SYN message including an UL TEID for a tunnel between said connection initiator and said initiator side module or node; retrieving said UL TEID from said TCP-SYN message; and storing said UL TEID.

It is preferred that, at the initiator side module or node, the method includes using a non-TCP connection to encapsulate a TCP synchronize acknowledgement (TCP-SYN ACK) message for sending to the connection initiator, said TCP-SYN ACK message including a DL TEID assigned by the initiator side module or node for a tunnel between the initiator side module or node and the connection initiator. The DL TEID retrieved from said TCP-SYN message is preferably mapped to the UL TEID assigned by the initiator side module or node for the tunnel between the initiator side module or node and the connection initiator.

A further step may comprise, at the CN side module or node, using a non-TCP connection to encapsulate a TCP synchronize (TCP-SYN) message for sending to a TCP server on the CN side of the backhaul network, said TCP-SYN message including a UL TEID assigned by the CN side module or node for a tunnel between the CN side module or node and the CN.

Preferably, at the CN side module or node, the method includes receiving from a CN module or node a TCP-SYN ACK message, said TCP-SYN ACK message including a DL TEID assigned by the CN module or node for a tunnel between the CN module or node and the CN side module or node. The UL TEID assigned by the CN side module or node is preferably mapped by the DL TEID assigned by the CN module or node for the tunnel between the CN side module or node and the CN.

The non-TCP connection is preferably a tunneling protocol connection and, more preferably, comprises a General Packet Radio Service (GPRS) tunneling protocol connection.

The initiator side module or node and the CN side module or node may each comprise a gateway (GW) node which includes a control plane (CP), a data plane (DP) and a TCP proxy (TP) module. Preferably, the CP of the initiator side GW and the CP of the CN side GW are arranged to receive an initial context set-up procedure and an E-UTRAN Radio Access Bearer (ERAB) set-up procedure.

The CP of the initiator side GW preferably assigns the CN side TEID when sending an Initial Context Set-up Request and ERAB Set-up Request to an eNodeB and retrieves the initiator side TEID on a received Initial Context Set-up Response and ERAB Set-up Response from the eNodeB.

The CP of the initiator side GW preferably records the initiator side TEID and CN side TEID as a mapped pair and transmits the same to the data plane on the same GW to enable the DP of that GW to de-encapsulate user traffic from a GTP tunnel received from the eNodeB based on the mapped initiator side TEID and to encapsulate user traffic onto said GTP for sending to the eNodeB using the mapped CN side TEID.

Furthermore, the CP of the CN side GW preferably assigns the initiator side TEID when sending an Initial Context Set-up Response and ERAB Set-up Response to the CN and retrieves the CN side TEID on a received Initial Context Set-up Request and ERAB Set-up Request from the CN.

Preferably also, the CP of the CN side GW records the CN side TEID and initiator side TEID as a mapped pair and transmits the same to the DP on the same GW to enable the DP to de-encapsulate user traffic from a GTP tunnel received from the CN based on the mapped CN side TEID and to encapsulate user traffic onto a GTP for sending to the CN using the mapped initiator side TEID.

The DP of the initiator side module may be arranged to receive incoming TCP connection setup request (TCP-SYNC) messages from an eNodeB and to de-encapsulate the initiator (eNodeB) side TEID from the GTP tunnel with the DP of the CN side GW being arranged to receive incoming TCP data from the CN/TCP server and to de-encapsulate the CN side TEID from the GTP tunnel.

The initiator side GW DP preferably forwards the TCP connect set-up request to the TP module on the same GW. The DP records the TCP request and GTP information, which is a combination of the incoming initiator side TEID, eNodeB GTP source IP address, CN side TEID, and the TCP connection information (TCP client IP address and port, TCP server IP address and port).

Preferably, the initiator side GW DP receives the TCP connection set-up response (TCP SYN-ACK) from the TP module on the same GW, the DP uses the TCP connection information (in the TCP SYN-ACK) to retrieve the respective CN side TEID. The DP uses the retrieved CN side TEID to encapsulate the TCP connection set-up response (TCP SYN-ACK) in the GTP tunnel and sends it to the connection initiator, i.e. eNodeB.

Preferably also, the CN side DP forwards the TCP connect set-up request to the TP module on the same GW. The DP records the TCP request and the GTP information, which is a combination of the incoming CN side TEID, CN GTP source IP address and the TCP connection information (TCP client IP address and port, TCP server IP address and port).

The CN side GW DP preferably receives the TCP connection set-up (TCP SYN-ACK) from the TP module on the same GW, the DP uses the TCP connection information (in the TCP SYN-ACK) to retrieve the respective initiator side TEID. The DP uses the retrieved initiator side TEID to encapsulate the TCP connection set-up response (TCP SYN-ACK) in the GTP tunnel and send it to the CN/TCP server.

Preferably, the TP module on the CN side GW receives the TCP connection setup request, synchronizes the TCP connection set-up request and the TCP connection information to the TP module on the other GW.

On receiving an incoming TCP connection request (TCP SYN), the TP module preferably handles the subsequent steps for the TCP connection establishment on behalf of the original TCP server with the initiator of the TCP connection request and, as a result, sends a (TCP SYN-ACK) response to the DP of the same GW.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method for setting-up a segmented tunnel connection for transporting data packets over a high latency network connection in a communication network, the method comprising the steps of:
    establishing a Transmission Control Protocol (TCP) first tunnel segment between a tunnel connection initiator device and an initiator side gateway module or node configured on a tunnel connection initiator side of the high latency network connection using a first mapped pair of tunnel endpoint identifiers (TEIDs), said first mapped pair of TEIDs comprising an uplink (UL) TEID and a downlink (DL) TEID for setting up said TCP first tunnel segment;
    at said initiator side gateway module or node, using non-TCP connection over said high latency network connection to encapsulate a non-TCP set-up connection message and sending said non-TCP set-up connection message to a core network (CN) side gateway module or node configured on CN side of the high latency network connection and, based on said non-TCP set-up connection message, establishing a non-TCP second tunnel segment between said initiator side gateway module or node and said CN side gateway module or node using a second mapped pair of TEIDs, said second mapped pair of TEIDs comprising a UL TEID and a DL TEID for setting up said non-TCP second tunnel segment; and
    establishing a TCP third tunnel segment between the CN side gateway module or node and the CN using a third mapped pair of tunnel endpoint identifiers (TEIDs), said third mapped pair of TEIDs comprising an uplink (UL) TEID and a downlink (DL) TEID for setting up said TCP third tunnel segment,
wherein the initiator side gateway module or node and the CN side gateway module or node each includes a control plane (CP), a data plane (DP) and a TCP proxy (TP) module.

2. The method of claim 1, wherein the non-TCP set-up connection message sent to the CN side gateway module or node includes the UL TEID of the second mapped pair of TEIDs, the UL TEID being assigned by the initiator side gateway module or node for the non-TCP second tunnel segment to be set-up between the initiator side gateway module or node and the CN side gateway module or node.

3. The method of claim 2, further comprising the step of:
    receiving at said initiator side gateway module or node a non-TCP connection set-up response message from said CN side gateway module or node, said connection set-up response message being encapsulated using a non-TCP connection, wherein said non-TCP connection set-up response message includes the DL TEID of the second mapped pair of TEIDs for the non-TCP second tunnel segment to be set-up between the CN side gateway module or node and said initiator side gateway module or node.

4. The method of claim 1, further comprising the steps at said initiator side gateway module or node of:
    receiving an encapsulated TCP synchronize (TCP-SYN) message from said connection initiator device, said TCP-SYN message including the UL TEID of the first mapped pair of TEIDs for the TCP first tunnel segment between said connection initiator device and said initiator side gateway module or node;
    retrieving said UL TEID from said TCP-SYN message; and
    storing said UL TEID.

5. The method of claim 4, further comprising the step of:
    at the initiator side gateway module or node, sending an encapsulated TCP synchronize acknowledgement (TCP-SYN ACK) message to the connection initiator device, said TCP-SYN ACK message including the DL TEID of the first mapped pair of TEIDs, the DL TEID being assigned by the initiator side gateway module or node for the TCP first tunnel segment between the initiator side gateway module or node and the connection initiator device.

6. The method of claim 1, further comprising the step of:
at the CN side gateway module or node, sending an encapsulated TCP synchronize (TCP-SYN) message to a TCP server on the CN side of the backhaul network, said TCP-SYN message including the UL TEID of the third mapped pair of TEIDs, the UL TEID being assigned by the CN side gateway module or node for the TCP third tunnel segment between the CN side gateway module or node and the CN.

7. The method of claim 6, further comprising the step of:
at the CN side gateway module or node, receiving from a CN device a TCP-SYN ACK message, said TCP-SYN ACK message including the DL TEID of the third mapped pair of TEIDs, the DL TEID being assigned by the CN device for the TCP third tunnel segment between the CN device and the CN side gateway module or node.

8. The method of claim 1, wherein the high latency network connection is a backhaul network.

9. The method of claim 1, wherein the connection initiator device comprises a base station or eNodeB.

10. The method of claim 1, wherein the non-TCP connection is private transport protocol connection.

11. The method of claim 1, wherein the CP of the initiator side gateway module or node and the CP of the CN side gateway_module or node are arranged to receive an initial context set-up procedure and an E-UTRAN Radio Access Bearer (ERAB) set-up procedure.

12. The method of claim 11, where the CP of the initiator side gateway module or node assigns the DL TEID of the first mapped pair of TEIDs when sending an Initial Context Set-up Request and ERAB Set-up Request to an eNodeB and retrieves the UL TEID of the first mapped pair of TEIDs on a received Initial Context Set-up Response and ERAB Set-up Response from the eNodeB.

13. The method of claim 12, where the CP of the initiator side gateway module or node records the UL TEID of the first mapped pair of TEIDs and DL TEID of the first mapped pair of TEIDs as a mapped pair and transmits the first mapped pair of TEIDs to the DP on the initiator side gateway module or node to enable the DP of the initiator side gateway module or node to de-encapsulate user traffic from a GTP tunnel received from the eNodeB based on the UL TEID of the first mapped pair of TEIDs and to encapsulate user traffic onto said GTP for sending to the eNodeB using the DL TEID of the first mapped pair of TEIDs.

14. The method of claim 11, where the CP of the CN side gateway module or node assigns the UL TEID of the third mapped pair of TEIDs when sending an Initial Context Set-up Response and ERAB Set-up Response to the CN and retrieves the UL TEID of the third mapped pair of TEIDs on a received Initial Context Set-up Request and ERAB Set-up Request from the CN.

15. The method of claim 14, where the CP of the CN side gateway module or node records the DL TEID of the third mapped pair of TEIDs and UL TEID of the third mapped pair of TEIDs as a mapped pair and transmits the third mapped pair of TEIDs to the DP on the CN side gateway module or node to enable the DP to de-encapsulate user traffic from a GTP tunnel received from the CN based on the DL TEID of the third mapped pair of TEIDs and to encapsulate user traffic onto a GTP for sending to the CN using the UL TEID of the third mapped pair of TEIDs.

* * * * *